(12) United States Patent
Alps et al.

(10) Patent No.: US 10,995,479 B2
(45) Date of Patent: May 4, 2021

(54) AIRCRAFT

(71) Applicant: Airbus Operations GmbH, Hamburg (DE)

(72) Inventors: Volker Alps, Hamburg (DE); Thomas Wiese, Hamburg (DE); Sebastian Flashaar, Hamburg (DE); Matthias Reiss, Hamburg (DE)

(73) Assignee: Airbus Operations GmbH

( * ) Notice: Subject to any disclaimer, the term of this patent is extended or adjusted under 35 U.S.C. 154(b) by 447 days.

(21) Appl. No.: 16/110,364

(22) Filed: Aug. 23, 2018

(65) Prior Publication Data
US 2019/0063046 A1 Feb. 28, 2019

(30) Foreign Application Priority Data

Aug. 31, 2017 (DE) ...................... 10 2017 119 961.6

(51) Int. Cl.
*E03B 1/02* (2006.01)
*B64D 11/00* (2006.01)
(Continued)

(52) U.S. Cl.
CPC ................ *E03B 1/02* (2013.01); *B64D 11/00* (2013.01); *B64D 11/02* (2013.01); *B64D 11/04* (2013.01); *C02F 1/283* (2013.01); *C02F 1/42* (2013.01); *C02F 5/02* (2013.01); *C02F 5/08* (2013.01); *C02F 2001/425* (2013.01); *C02F 2201/001* (2013.01); *C02F 2201/003* (2013.01); *C02F 2201/005* (2013.01); *C02F 2201/006* (2013.01)

(58) Field of Classification Search
CPC .......... E03B 1/02; E03B 1/042; B64D 11/00; B64D 11/02; B64D 11/0007; B64D 11/04
USPC ....................................... 244/118.5
See application file for complete search history.

(56) References Cited

U.S. PATENT DOCUMENTS 3,780,867 A  12/1973  Zirlis
5,429,149 A * 7/1995  Mittell ................... B64D 11/02
                                                              137/2
(Continued)

FOREIGN PATENT DOCUMENTS

DE          10229799 A1 * 1/2004 ............ E03B 1/042
DE    10 2008 039 667 A1   4/2010
(Continued)

*Primary Examiner* — Christopher P Ellis
(74) *Attorney, Agent, or Firm* — Lerner, David, Littenberg, Krumholz & Mentlik, LLP

(57) ABSTRACT

An aircraft has: an aircraft fuselage, a cabin region formed in the aircraft fuselage, underfloor region separated from the cabin region by a floor partition, and a fresh-water supply system. The fresh-water supply system has a fresh-water provision unit arranged in the underfloor region. The fresh-water supply system has multiple water extraction units which are each arranged in the cabin region, and a water line network branched off from the fresh-water provision unit and extending to the water extraction units. Each water extraction unit has a shut-off valve, a filter unit and a tapping point, which are coupled in series by means of water lines. Each filter unit has an exchangeable water filter with a first filter material designed for filtering particles out of the water flowing through the water filter and with a second filter material designed for softening the water flowing through the water filter.

15 Claims, 4 Drawing Sheets

(51) Int. Cl.
*B64D 11/02* (2006.01)
*B64D 11/04* (2006.01)
*C02F 1/42* (2006.01)
*C02F 5/02* (2006.01)
*C02F 1/28* (2006.01)
*C02F 5/08* (2006.01)

(56) References Cited

U.S. PATENT DOCUMENTS

| | | | | |
|---|---|---|---|---|
| 5,707,027 | A * | 1/1998 | Hiesener | E03D 5/00 244/118.5 |
| 6,055,996 | A * | 5/2000 | Sprenger | A47L 15/0076 134/133 |
| 7,014,148 | B2 | 3/2006 | Dominguez | B64C 1/1469 244/118.5 |
| 8,074,933 | B2 * | 12/2011 | Mackulin | B64D 11/02 244/136 |
| 8,931,737 | B2 | 1/2015 | Savignac | B64D 11/02 244/118.5 |
| 9,096,321 | B2 * | 8/2015 | Burd | B64D 11/02 |
| 9,617,004 | B2 * | 4/2017 | Dannenberg | B64D 11/00 |
| 10,059,454 | B2 * | 8/2018 | Burd | B64D 11/04 |
| 2005/0266287 | A1 * | 12/2005 | Hoffjann | B64D 11/02 429/414 |
| 2006/0225200 | A1 * | 10/2006 | Wierenga | E03F 1/006 4/664 |
| 2007/0069078 | A1 * | 3/2007 | Hoffjann | B64D 11/02 244/129.1 |
| 2007/0214562 | A1 * | 9/2007 | Becker | B64D 11/02 4/598 |
| 2010/0051519 | A1 * | 3/2010 | Maier-Witt | C02F 1/008 210/89 |
| 2010/0125938 | A1 * | 5/2010 | Billon | E03D 5/006 4/317 |
| 2010/0259046 | A1 * | 10/2010 | Kota | F03D 1/0641 290/44 |
| 2011/0089092 | A1 | 4/2011 | Williams et al. | |
| 2013/0312844 | A1 * | 11/2013 | Burd | F16K 17/12 137/217 |
| 2014/0014567 | A1 | 1/2014 | Boodaghians et al. | |
| 2014/0102553 | A1 * | 4/2014 | Burd | B64D 11/0007 137/315.01 |
| 2014/0166556 | A1 | 6/2014 | Williams et al. | |
| 2015/0000749 | A1 * | 1/2015 | Holmes | B64C 1/067 137/1 |
| 2018/0009680 | A1 * | 1/2018 | Walter | C02F 9/005 |
| 2018/0029708 | A1 * | 2/2018 | Holmes | B64C 1/067 |

FOREIGN PATENT DOCUMENTS

| | | |
|---|---|---|
| DE | 10 2009 017 497 A1 | 10/2010 |
| DE | 10 2014 109 997 A1 | 2/2016 |
| DE | 10 2015 102 011 A1 | 8/2016 |
| EP | 2 975 003 A1 | 1/2016 |
| WO | 97/40906 A1 | 11/1997 |
| WO | 2010/142924 A2 | 12/2010 |
| WO | 2014/039837 A1 | 3/2014 |

* cited by examiner

AIRCRAFT

FIELD OF THE INVENTION

The invention relates to an aircraft which has an aircraft fuselage, a cabin region formed in the aircraft fuselage, an underfloor region which is formed in the aircraft fuselage and which is separated from the cabin region by a floor partition arranged in the aircraft fuselage, and a fresh-water supply system.

BACKGROUND OF THE INVENTION

The interior space of the aircraft fuselage of an aircraft may be divided by the floor partition into the cabin region and into the underfloor region. The underfloor region is thus arranged below the cabin region. A freight region of the aircraft may be formed by the underfloor region, or may at least be arranged therein. In the cabin region of the aircraft, there are often arranged at least one on-board kitchen and at least one on-board toilet. Furthermore, the seats for passengers are arranged in the cabin region. The on-board kitchen may have at least one water-conducting appliance, such as for example a water heater, a coffee machine and/or a dishwasher. The on-board toilet may also have a water-conducting appliance, such as for example a toilet per se and/or a water heater.

A water-conducting appliance of the on-board kitchen and/or of the on-board toilet may be supplied with fresh water by means of the fresh-water supply system of the aircraft. The provision of a supply to water-conducting appliances of an on-board kitchen and/or of an on-board toilet of an aircraft by means of a fresh-water supply system of the aircraft is known. Here, the fresh-water supply system has a fresh-water provision unit. The fresh-water provision unit may for example have a fresh-water tank and a water pump, which are coupled to one another such that fresh water from the fresh-water tank is pressurized by means of the pump, and provided, by the fresh-water provision unit. The fresh-water supply system may furthermore have a water line network, such that water can be pumped from the fresh-water provision unit through the water line network. The fresh-water supply system furthermore has multiple water extraction units. The water line network extends from the fresh-water provision unit to the water extraction units, such that the pressurized water can flow from the fresh-water provision unit to each of the water extraction units. Each of the water extraction units has a tapping point. A tapping point may for example constitute a port and/or an interface for or to any desired water-conducting appliance. Accordingly, a tapping point may for example be a water port. The fresh-water supply system thus serves for the provision and supply of water to water-conducting appliances within the cabin region of the aircraft.

In order to make it possible for the water provided by the fresh-water provision unit to flow with the desired water quality via the water line network to the water extraction units, provision may be made for a water filter to be integrated into the water line network directly downstream of the fresh-water provision unit in the flow direction. The water line network which subsequently branches off to the water extraction units then conducts the fresh water that has been filtered by the water filter.

BRIEF SUMMARY OF THE INVENTION

In practice, it has been found that the abovementioned water filter must be changed very frequently in order to ensure the desired water quality of the filtered water. The fresh-water provision unit is preferably arranged in the underfloor region in order for the cabin region to be utilized as effectively as possible for passengers. Since the water filter in the example discussed above is integrated in the water line network directly downstream of the fresh-water provision unit, the persons exchanging the water filter must also have access to the underfloor region of the aircraft. Access authorizations are however associated with the authorization to access the underfloor region. Accordingly, a person performing cleaning work in the on-board kitchen and/or in the on-board toilet normally cannot enter the underfloor region. There is therefore an increased personnel requirement for the changing of the water filter.

An aspect of the invention proposes an aircraft having a fresh-water supply system which both permits the provision of water for multiple water extraction units with the respectively desired water quality, and also gives rise to the least possible maintenance costs.

An aircraft is proposed which has an aircraft fuselage, a cabin region formed in the aircraft fuselage, an underfloor region which is formed in the aircraft fuselage and which is separated from the cabin region by a floor partition arranged in the aircraft fuselage, and a fresh-water supply system. The fresh-water supply system has a fresh-water provision unit which is arranged in the underfloor region. Furthermore, the fresh-water supply system has multiple water extraction units which are each arranged in the cabin region. Furthermore, the fresh-water supply system has a water line network which is branched off from the fresh-water provision unit and which extends to the water extraction units. The water line network is designed such that water can flow from the fresh-water provision unit to each of the water extraction units. Each water extraction unit has a shut-off valve, a filter unit and a tapping point. The shut-off valve, the filter unit and the tapping point of a respectively associated water extraction unit are coupled in series by means of water lines of the respective water extraction unit, such that water can flow from the shut-off valve of the respective water extraction unit through the filter unit of the respective water extraction unit to the tapping point of the respective water extraction unit. Each filter unit has an exchangeable water filter with a first filter material and with a second filter material. The first filter material is designed for filtering particles out of the water flowing through the water filter. The second filter material is designed for softening the water flowing through the water filter.

The expression "softening" may in particular be understood to mean a hardness stabilization. Accordingly, the second filter material may be designed for stabilizing the hardness of the water flowing through the water filter.

The water extraction units of the fresh-water supply system are arranged in the cabin region. Provision is furthermore preferably made for the water filter unit of a respective water extraction unit to be arranged between the shut-off valve of the respective water extraction unit and the tapping point of the respective water extraction unit. In order to exchange the water filter of the water filter unit, it is thus possible for firstly the shut-off valve of the respective water extraction unit to shut off the water flow to the water filter unit, such that, during the exchange of the water filter, there is no or only very little escape of water. The exchange of the water filter of a water filter unit may furthermore be performed within the cabin region. This is because every water extraction unit is arranged in the cabin region. The exchange of the water filters can thus be performed by the persons responsible for the cleaning of the cabin region, in particular of the on-board kitchen and/or of the on-board toilet. By virtue of the water filters of the water filter units being arranged in the cabin region, a particularly straightforward, fast and expedient exchange of the water filters is thus made possible.

Provision may furthermore be made for the fresh-water supply system to have at least one tapping point for which no prior water filtering is necessary. A water filter integrated into the water line network directly downstream of the water provision unit in the flow direction cannot be tailored to the abovementioned relatively low demand on the water quality, because all of the water is filtered by means of a central water filter.

By virtue of the water extraction units each being assigned a filter unit with an associated water filter, the respectively desired water quality can be tailored to the requirements. The corresponding water filters are also referred to as decentralized water filters. Each water filter can be adapted, in terms of the associated size and/or filter performance, to the respective purpose of the water extraction unit. The exchangeable water filter of a water filter unit of a water extraction unit furthermore makes it possible for the corresponding water filter to be exchanged in accordance with requirements. Accordingly, the water filter of a water extraction unit may be exchanged at relatively short exchange intervals if the water extraction unit serves for example for the provision of water to the on-board kitchen, in particular to a water boiler and/or to a coffee machine.

By virtue of multiple filter materials with different filter functions being integrated in the same water filter, the corresponding exchangeable water filter furthermore contributes to a simple, fast and expedient exchange.

Furthermore, in practice, it has been found that the functional capability of the second filter material is often dependent on the functional capability of the first filter material. Accordingly, the softening, in particular the hardness stabilization, may for example function adequately only if, for example, an adequate quantity of particles has been filtered out of the water beforehand. In this example, the two filter materials of the common water filter offer the advantage that both filter functions are always ensured by means of the regular simultaneous exchange of the water filter. By contrast, in the case of separate filters which each perform only one of the filter functions, an error could occur in the case of which, for example, only one of the two filters is exchanged. This may then lead to an impairment of the descaling and/or of the limescale protection of the water. In the case of the filters with both filter materials, such an error does not occur. The quality demands placed on the filtered water can thus be ensured in a particularly reliable manner. The quality demands relate preferably firstly to the degree of hardness of the filtered water and secondly to the (in particular relative) particle count of the filtered water, in particular with regard to particles of a predetermined particle size and/or with predetermined substance characteristics.

An advantageous embodiment of the aircraft is characterized in that the first filter material is activated carbon filter material. Provision may at least be made whereby for example at least 80 volume per cent and/or at least 80 mass per cent of the first filter material is composed of activated carbon filter material. Activated carbon filter material may be designed to filter particles with particular substance characteristics and/or particular particle sizes out of water that flows through the activated carbon filter material. By means of the activated carbon filter material, it is thus possible to ensure sterilization of and/or a reduction in the number of germs in water that flows through the activated carbon filter material.

An advantageous embodiment of the aircraft is characterized in that the second filter material is formed as a catalyst material. Provision may also be made whereby the second filter material has at least one catalyst material. By means of the catalyst material, it is possible for the softening, in particular the hardness stabilization, of the throughflowing water to be performed by catalysis. The catalyst material is preferably formed as a resin material, and/or is bonded or mixed into a resin material. In one advantageous embodiment, the catalyst material and/or the resin material with the catalyst material causes the excess calcium and/or carbonate ions in the water to be converted into, in particular extremely small, limescale crystals by means of a catalysis process. In this way, important minerals could be retained in the water. Furthermore, the formation of limescale deposits can be prevented, because the crystals have lost their capability to permanently accumulate, in particular in the water-conducting system. As an effect of this, it is possible to dispense with further additives, such as for example chemicals or salts, for the water. Alternatively and/or in addition, the second filter material may be designed so as to combine calcium and/or carbonate ions from the water to form limescale crystals by means of catalyst technology and/or associated catalyst material. In this way, the effective water hardness, and/or the precipitation of hardness, is reduced.

A further advantageous embodiment of the aircraft is characterized in that the first filter material is of granulate-like form and/or in that the second filter material is of granulate-like form. By means of the granulate-like form of the first and/or second filter material, the respectively associated filter function can be adapted in a particularly effective and simple manner in terms of the respective performance thereof. To increase the filter performance, it is for example possible for more granulate-like filter material of the first and/or second filter material to be provided for the water filter. The performance of the water filter with regard to the filter function of the first filter material and/or with regard to the softening function (likewise referred to as a filter function) of the second filter material can therefore be particularly easily scaled if the respective first and second filter material are of granulate-like form. The softening function may relate in particular to the hardness stabilization.

A further advantageous embodiment of the aircraft is characterized in that the first filter material is of dimensionally stable and/or open-pore form. A further advantageous embodiment of the aircraft is characterized in that the second filter material is of dimensionally stable and/or open-pore form. Both filter materials or one of the two filter materials may thus be of dimensionally stable form. The first and/or second filter material can thus contribute to the dimensional stability of the exchangeable water filter. This reduces the inherent weight of the exchangeable water filter. By virtue of the first and/or second filter material being of open-pore form, the respective filter material can form a particularly large surface with respect to the water flowing through the water filter. As an effect of this, the exchangeable water filter can be of particularly small or particularly compact form.

A further advantageous embodiment of the aircraft is characterized in that that part of the fresh-water supply system, in particular of the associated water line network, which is arranged in the underfloor region has no filters for water filtering. By virtue of the fact that thus no filters for the water filtering of the fresh-water supply system or of the water line network are arranged in the underfloor region, it can be ensured that the water filtering of the fresh-water supply system takes place exclusively in the cabin region. Thus, the exchangeable water filters of the fresh-water supply system can also be exchanged by the personnel responsible for the cleaning of the on-board kitchen and/or of the on-board toilet. Therefore, no authorization to access the underfloor region is necessary to exchange the exchangeable water filter. The change or exchange of the water filter can thus be performed particularly easily and quickly, which offers a corresponding cost advantage.

A further advantageous embodiment of the aircraft is characterized in that the water filter of each filter unit is formed as an exchangeable water filter cartridge. The water filter cartridge is held releasably by a filter cartridge holder of the respective filter unit. Provision is preferably made whereby water flowing from a shut-off valve to the tapping point of the associated water extraction unit firstly flows in its entirety through the water filter held by the associated filter unit. A bypass and/or a bypass flow in relation to the water flow through the filter unit or in relation to the water filter of the respective water extraction unit is not provided. A water filter cartridge permits a particularly straightforward and fast exchange. This reduces a possible standstill time of the aircraft for the exchange of the water filter cartridge and thus also the associated costs. Furthermore, a water filter cartridge can be exchanged in a particularly reliable manner, because it can be formed as a handlable unit. In particular, it is possible for the external shape of the filter cartridge and/or the filter cartridge holder to be designed such that erroneous insertion of the water filter cartridge into the filter cartridge holder is prevented. The filter cartridge holder may be designed to hold the water filter cartridge in only one predetermined position. This can ensure that the sequence for the water flowing through the water filter cartridge, with regard to the first filter material and the second filter material, is ensured.

A further advantageous embodiment of the aircraft is characterized in that each water filter cartridge is formed as a water filter cartridge which can be plugged into and unplugged from the respective filter cartridge holder. Each of the filter cartridge holders may be designed for the plugging-in and unplugging of a water filter cartridge. In other words, each filter cartridge holder may be designed for the plugging-in and unplugging of a water filter cartridge. An unplugging may for example be a pulling-out action and/or a detachment action. The water filter cartridge that can be plugged in and unplugged may also be referred to as a plug-type cartridge. It facilitates the exchange of the water filter cartridge. This is because the exchange of the corresponding water filter cartridge can be performed preferably without tools. Here, provision may be made for each filter cartridge holder to be designed for the plugging-in and unplugging of a water filter cartridge without the use of tools. This may be provided correspondingly for each of the water filter cartridges that can be plugged in and unplugged. The exchange of a water filter in the form of a water filter cartridge without the use of tools by simply unplugging an "old" water filter cartridge and subsequently plugging in a "new" water filter cartridge is possible in a particularly straightforward, fast and expedient manner.

A further advantageous embodiment of the aircraft is characterized in that the multiple water filters are of identical design. The identical design of the water filters may relate to the construction, to the structural design, and/or to the respective external dimensions. Accordingly, the water filters may be identical in construction, in structural design and/or in terms of their external dimensions. In other words, the multiple water filters may be of uniform design. It is thus possible for uniform water filters to be provided for the multiple filter units. With uniform water filters, considerable costs can be saved in exchanging the water filters. This is because uniform water filters can be produced and stocked particularly inexpensively. Furthermore, errors in the exchange of the water filters can be prevented or at least reduced. This is because the use of an incorrect water filter is virtually ruled out.

An advantageous embodiment of the aircraft is characterized in that the water extraction unit is assigned to in each case one kitchen monument in the cabin region or in each case one toilet monument in the cabin region. Accordingly, for example, one water extraction unit of the fresh-water supply system may be assigned to a cabin monument in the cabin region of the aircraft. A further water extraction unit of the fresh-water supply system may be assigned to a toilet monument in the cabin region of the aircraft. If the kitchen monument is cleaned by the cleaning personnel, the cleaning personnel can in this case also exchange the water filter of the filter unit of the water extraction unit assigned to the kitchen monument. Such an exchange can thus be performed particularly easily and efficiently. This therefore also reduces the costs for the exchange of the water filter. A corresponding situation can apply to the water filter of the water filter unit of the water extraction unit assigned to the toilet monument.

A further advantageous embodiment of the aircraft is characterized in that each water filter has a housing, an interior space formed by the housing, a first port for the supply of water into the interior space, and a second port for the discharge of water out of the interior space, wherein the interior space is filled with the first and second filter material such that water can flow from the first port to the second port while being in direct contact with the filter materials. With such a design, each water filter can be formed as a water filter cartridge, wherein the housing can form the respectively associated cartridge housing. Preferably, the housing is fluid-tight, in particular water-tight, with the exception of the first and second ports. Water filters with the construction discussed above are particularly easily handlable.

A further advantageous embodiment of the aircraft is characterized in that the interior space of each housing is divided by a screen-like partition into a first filter chamber and a second filter chamber, wherein the first filter material is arranged exclusively in the first filter chamber and the second filter material is arranged exclusively in the second filter chamber. Furthermore, the screen-like partition may be formed such that a mixing of the filter materials is prevented. Accordingly, the screen-like partition may preferably be formed so as to be impermeable to the first filter material and/or to the second filter material. By means of the screen-like partition, it is thus possible for the filter function of the first filter material and the softening function, in particular hardness stabilization, of the second filter material to be spatially separated from one another. Furthermore, by means of the separation, it is possible for firstly particles to be filtered out of the water by means of the first filter material, in order to subsequently realize an adequate softening quality, in particular an adequate hardness stabilization quality, of the water by means of the second filter material. This is advantageous in particular if the softening function of the second filter material is dependent on the filter function of the first filter material.

A further advantageous embodiment of the aircraft is characterized in that the partition of each water filter is designed and/or arranged such that the second filter chamber is arranged downstream of the first filter chamber in a flow direction for water from the first port to the second port. This ensures that water supplied through the first port firstly flows through and/or flows around the first filter material in the first filter chamber, subsequently flows through the screen-like partition, and thereupon flows through and/or around the second filter material in the second filter chamber, before finally being discharged from the interior space of the water filter through the second port. Reference is made analogously to the effects and/or advantages discussed above.

A further advantageous embodiment of the aircraft is characterized in that the housing of each water filter has a cylindrical form, wherein the first port of the respective water filter is arranged on a first end side of the housing, the second port of the respective water filter is arranged on a second end side of the housing, and the partition of the respective water filter is arranged between the end sides of the housing such that the filter chambers of the respective water filter are arranged in series in a longitudinal axial direction of the housing so as to be separated by the partition. An example of a screen-like partition for a water filter of said type may for example be a round, in particular circular, disc-like partition which extends in a radial direction within the housing of the respective water filter. It is however basically also conceivable for the partition to extend obliquely with respect to the longitudinal axial direction of the respective housing. Other embodiments of the partition are likewise conceivable. The partition of a water filter as per the embodiment mentioned above offers the advantage that the filter chambers are arranged in series in the longitudinal axial direction of the respective housing. Preferably, the second filter chamber is arranged downstream of the first filter chamber in a flow direction for water from the first port to the second port. The longitudinal axial direction may correspond to the flow direction of the water. The water thus flows firstly through the first filter chamber and then through the second filter chamber. The arrangement of the ports on the end sides of the housing is particularly easily possible. Thus, such water filters can be produced particularly inexpensively and easily.

A further advantageous embodiment of the aircraft is characterized in that the housing of each water filter has a hollow cylindrical form, and the partition of the respective water filter is arranged as a ring-shaped, screen-like partition in the interior space of the housing of the respective water filter, such that the first filter chamber of the respective water filter is arranged radially to the outside of, and so as to be separated by means of the partition from, the second filter chamber of the respective water filter. In such an embodiment, water can thus firstly flow into the radially outer filter chamber of the respective water filter and then flow in a radial direction through the ring-shaped and screen-like partition into the second filter chamber, before then finally being discharged through the second port. Preferably, the ring-shaped partition makes it possible for water to flow from the first filter chamber to the second filter chamber over the entire ring-shaped partition. Water thus flows in the radial direction through the ring-shaped partition from the first chamber into the second chamber over the full circumference. The ring-shaped and screen-like partition therefore constitutes a particularly low flow resistance for the water passing through. A water filter of said type thus has a particularly low flow resistance overall. Consequently, less energy has to be expended to provide filtered water at an adequate conveying rate.

Further features, advantages and possible uses of the present invention will emerge from the following description of the exemplary embodiments and from the figures. Here, all of the features described and/or illustrated in the figures form the subject matter of the invention individually and in any desired combination, even independently of the combination thereof in the individual claims or of the back-references thereof. Furthermore, in the figures, the same reference designations are used for identical or similar objects.

BRIEF DESCRIPTION OF THE DRAWINGS

FIG. 1 illustrates an exemplary embodiment of an aircraft 10 in a schematic perspective view. The aircraft 10 has an aircraft fuselage 12. The aircraft fuselage 12 preferably has an at least substantially circular cross section.

FIG. 2 illustrates a part of a cross-sectional view of the aircraft fuselage 12. A cabin region 14 and an underfloor region 16 are formed within the aircraft fuselage 12. The underfloor region 16 is separated from the cabin region 14 by a floor partition 18 arranged in the aircraft fuselage 12. The so-called freight region is also arranged in the underfloor region 16. The freight region may also be formed by the underfloor region 16.

DETAILED DESCRIPTION

Figure 1:
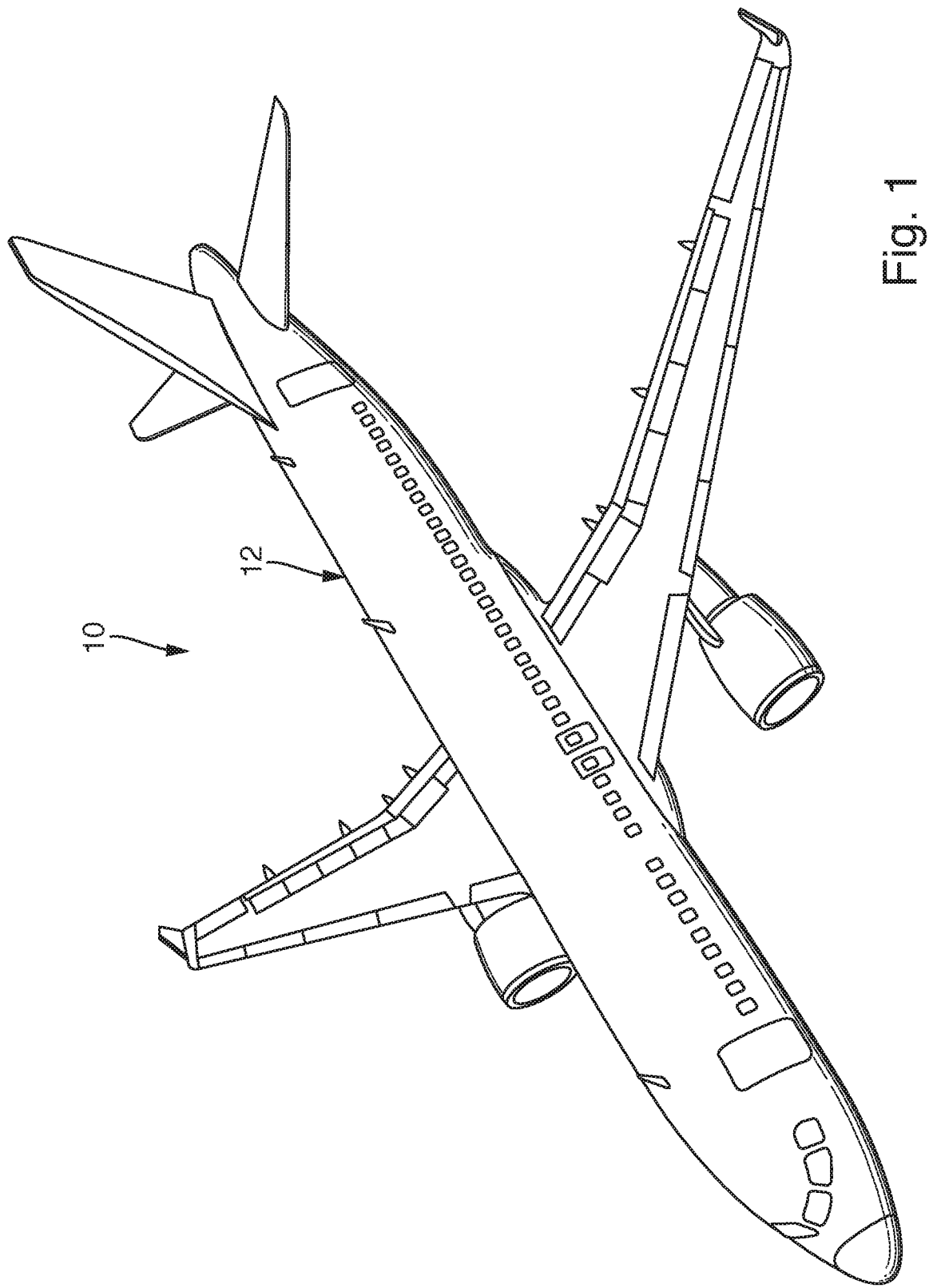
FIG. 1 shows an embodiment of an aircraft in a schematic perspective view.
Figure 2:
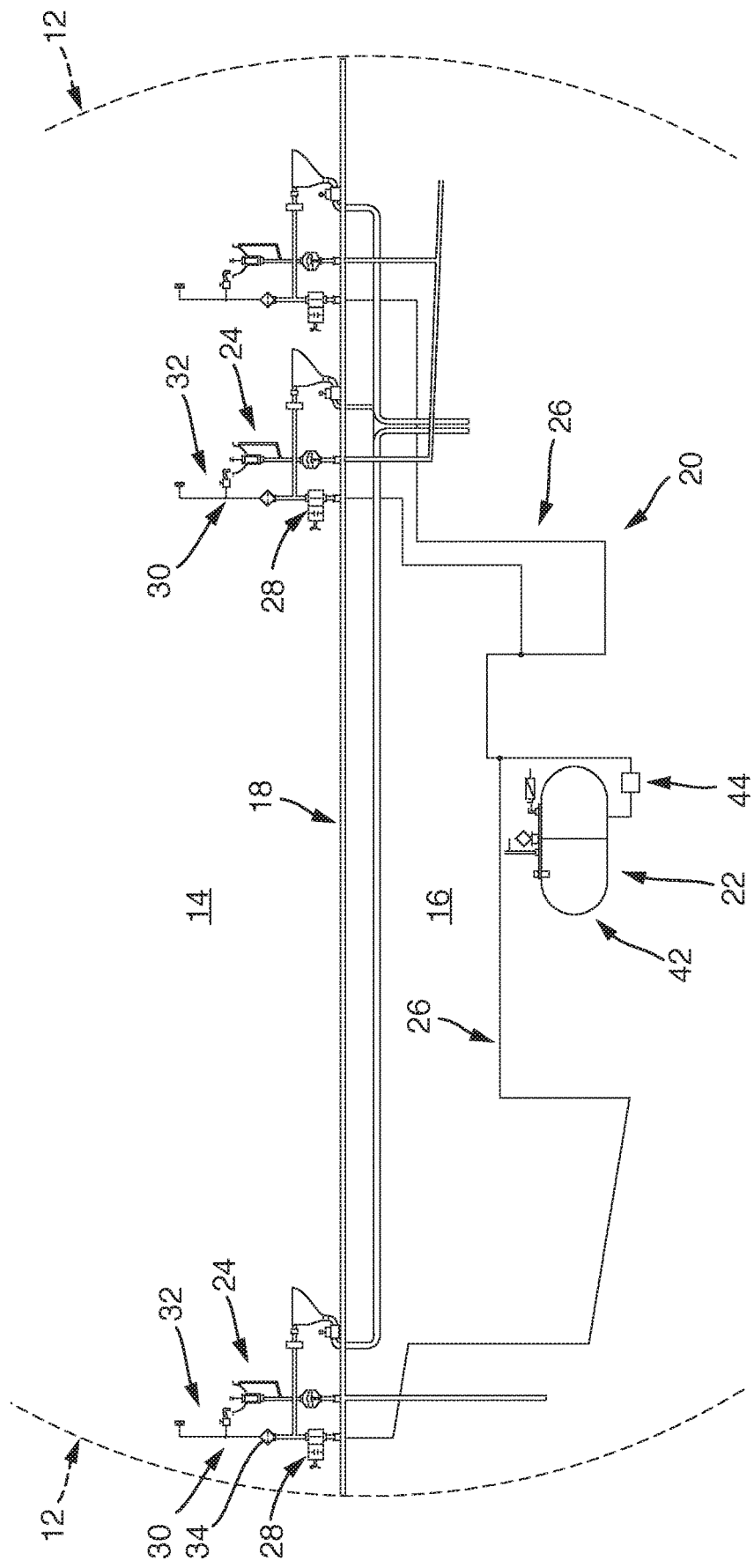
FIG. 2 shows a part of an exemplary embodiment of an interior space of an aircraft fuselage in a schematic sectional view.

Furthermore, the aircraft 10 has a fresh-water supply system 20 arranged in the aircraft fuselage 12. The fresh-water supply system 20 has a fresh-water provision unit 22, multiple water extraction units 24, and a water line network 26 which is branched off from the fresh-water provision unit 22 and which extends to the water extraction units 24. The fresh-water provision unit 22 is arranged in the underfloor region 16. The water extraction units 24 are, by contrast, each arranged in the cabin region 14. The water line network 26 thus extends from the fresh-water provision unit 22 through the underfloor region 16, and through the floor partition 18 into the cabin region 14, to each of the multiple water extraction units 24. Here, the water line network 26 is designed such that water can flow from the fresh-water provision unit 22 to each of the water extraction units 24. Preferably, the fresh-water provision unit 22 has, for this purpose, a fresh-water tank 42 and a water pump 44. By means of the pump 44, the fresh water stored in the fresh-water tank 42 can be pumped into the water line network 26, such that said fresh water flows under pressure to the water extraction units 24. FIG. 2 schematically illustrates multiple water extraction units 24 to which the water can flow.

Figure 3:
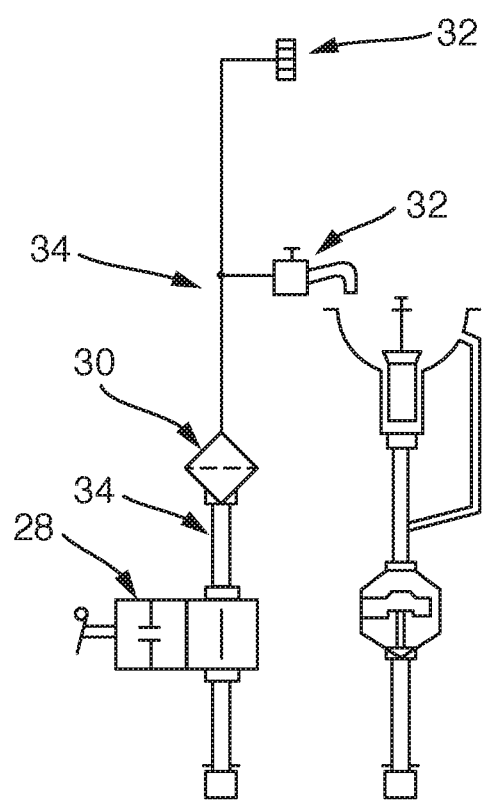
FIG. 3 shows an exemplary embodiment of a water extraction unit in a schematic illustration.

FIG. 3 schematically illustrates, on an enlarged scale, a water extraction unit 24 in a further embodiment, such as may be used for the aircraft 10 from FIG. 2, for example instead of at least one of the water extraction units 24 illustrated therein.

The water extraction unit 24 illustrated in FIG. 3 may for example be assigned to a kitchen monument from the cabin region 14 of the aircraft 10. Basically, each water extraction unit 24 has a shut-off valve 28, a filter unit 30 and a tapping point 32. Instead of one tapping point 32, it is also possible for multiple tapping points 32 to be provided. The shut-off valve 28 of the water extraction unit 24, the associated filter unit 30 and the associated at least one tapping point 32 are coupled in series by means of water lines 34 such that water can flow from the shut-off valve 28 through the filter unit 30 to the at least one tapping point 32.

Provision is furthermore made for each filter unit 30 to have an exchangeable water filter 36. An exemplary embodiment of a water filter 36 is illustrated in a schematic perspective view in FIG. 4.

Each water filter 36 has a first filter material 38 and a second filter material 40. The first filter material 38 of each water filter 36 is designed for filtering particles out of water that flows through the respective water filter 36. The second filter material 40 of each water filter 36 is designed for softening, in particular hardness stabilization, of water that flows through the respective water filter 36. The filtering of particles out of the water by means of the first filter material 38 is also referred to as first filter function. The softening or the hardness stabilization of the water by means of the second filter material 40 is also referred to as second filter function or softening function. By means of the first filter material 38, particles can be filtered out of the water flowing through the associated water filter 36. Additionally or alternatively, the odour and/or the taste of water can be improved as a result of the filtering-out of particles.

The second filter material 40 of each water filter 36 is designed for softening, in particular hardness stabilization, of water. Water that flows through the second filter material 40 thus subsequently has a lower degree of water hardness. This can be ensured in particular by means of the reduction of the calcium fraction and/or magnesium fraction in the water. Water with a lower degree of hardness is particularly advantageous for an appliance connected to a water extraction unit, such as a water heater or a coffee machine. This is because a failure rate caused by limescale accumulation can be reduced by means of the correspondingly filtered water.

Each water filter 36 is, by means of the first filter material 38 and the second filter material 40, designed to reliably ensure each of the two filter functions. Each water extraction unit 24 has a filter unit 30 with the associated exchangeable water filter 36. The water provided at each tapping point 32 of the respective water extraction unit 24 is in this case the water filtered by the associated filter unit 36.

As can be seen from FIG. 2, each water extraction unit 24 is arranged in the cabin region 14. Thus, provision may for example be made for one of the water extraction units 24 to be assigned to a kitchen monument in the cabin region 14. The tapping point 32 of said water extraction unit 24 may then be designed as an interface to a water line of a water-conducting appliance of the kitchen monument. Accordingly, the tapping point 32 may for example constitute a water port to which a water line of a coffee machine of the kitchen monument is connected. A further tapping point 32 of the water extraction unit 24 of the kitchen monument may for example form a water tap. As already discussed above, in the case of the water extraction unit 24, the water flows firstly through the shut-off valve 28 and thereupon via a water line 34 to the water filter 30, before it can flow via further water lines 34 to the two tapping points 32. The water for the two tapping points 32 is thus filtered beforehand by means of the water filter 36 of the water filter unit 30 of the abovementioned water extraction unit 24.

In practice, it has proven to be particularly advantageous if for example the water for a coffee machine or the water that can be extracted at a water tap within the kitchen monument is filtered of particles by means of the first filter material 38 and the hardness of the pre-filtered water is reduced by means of the second filter material 40. Specifically, this has the advantageous effect that the water-conducting electrical appliance, in particular the coffee machine, is subject to particularly little limescale accumulation. Furthermore, the water used exhibits particularly little odour, and furthermore has an advantageous taste. This in turn increases the satisfaction of the passengers if they are presented with coffee and/or other meals prepared using the filtered water.

In summary, it is thus desirable to provide water with a good odour quality, high taste quality and a particularly low degree of hardness. To be able to ensure this in a continuous manner, it is necessary for the water filters 36 to be exchanged at regular intervals. The water filter unit 30 of each water extraction unit 24 is thus designed for the exchange of the exchangeable water filter 36.

It has proven to be particularly advantageous if that part of the fresh-water supply system which is arranged in the underfloor region 16, or that part of the water line network which is arranged in the underfloor region 16, has no filters for water filtering. To perform maintenance on or an exchange of the water filters 36, there is therefore no need to access the underfloor region 16. Aside from the water filters 36 in the cabin region 14, the fresh-water supply system 20 is particularly preferably assigned no further filters for water filtering. An exchange of the water filters 36 is thus sufficient to ensure the desired water quality and/or water hardness.

It has proven to be particularly advantageous if each of the water filters 36 is of identical design. The water filters 36 of the various water extraction units 24 can thus be identical or of identical design. The water filters 36 may be uniform water filters. This facilitates the exchange. This is because, during the exchange, there is no need to pay attention to a possible size, a particular construction and/or other special design embodiments. Rather, during the exchange, it is sufficient for the "old" water filter 36 to be replaced with a "new" water filter 36. This can then be performed for each, or a desired number, of the filter units 30 of the water extraction units 24. Through the use of uniform water filters 36, it is thus possible for the failure rate in the exchange of the water filters 36 to be reduced. Furthermore, uniform water filters 36 can be produced particularly efficiently and inexpensively.

Furthermore, in practice, it has proven to be particularly advantageous if each water filter 36 is formed as a water filter cartridge. A water filter 36 formed as a water filter cartridge offers the advantage that the water filter 36 is then particularly easily handlable. Furthermore, the handling of such a water filter 36 is particularly hygienic, because direct contact with the filter materials can be avoided. This is the case in particular if the water filter cartridge is gripped only by the housing 46.

Figure 4:
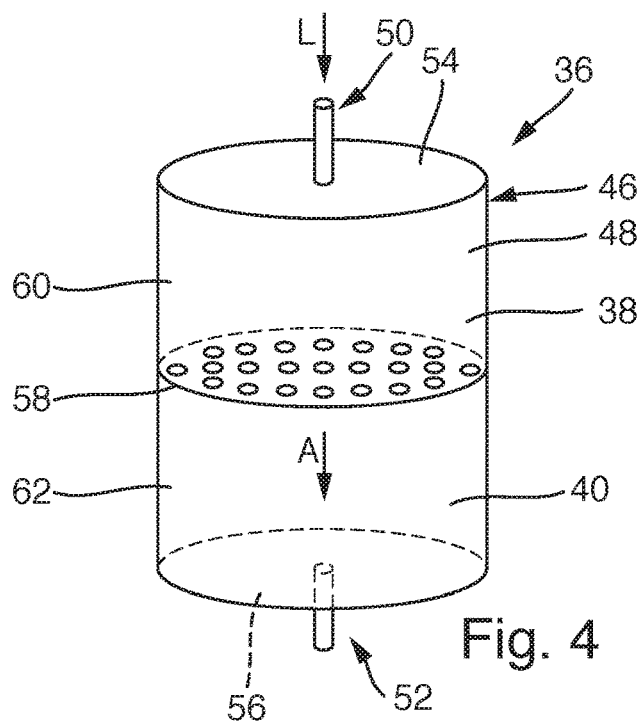
FIG. 4 shows a first exemplary embodiment of the water filter in a schematic perspective illustration.

An advantageous embodiment of the water filter 36 as a water filter cartridge 36 will be discussed on the basis of FIG. 4. FIG. 4 illustrates a water filter 36 as a water filter cartridge 36, wherein the latter has a housing 46 and an interior space 48 formed by the housing 46. On the housing 46, there is arranged a first port 50 which is designed for the supply of water into the interior space 48. On the housing 46, there is furthermore arranged a second port 52, which is designed for the discharge of water out of the interior space 48. Furthermore, the interior space 48 is filled with the first filter material 38 and the second filter material 40 such that water can flow from the first port 50 to the second port 52 while being in direct contact with the filter materials 38, 40. The housing 46 is of water-tight design with the exception of the first and second ports 50, 52. During the exchange of the water filter 36 or of the water filter cartridge 36, the latter can be gripped by the housing, such that no contact with the ports 50, 52 and/or the filter materials 38, 40 is necessary. Thus, a particularly hygienic exchange of the water filter 36 or of the water filter cartridge 36 is possible.

The filter unit 30 of each water extraction unit 24 is designed for releasably retaining a water filter 36. A water filter 36 retained by the respective filter unit 30 may in this case be releasably coupled to the water lines 34 of the respective water extraction unit 24 such that water can flow from the shut-off valve 28 of the respective water extraction unit 24, through the associated filter unit 30 with the retained water filter 36, to the at least one tapping point 32. In other words, by means of the retention of a water filter 36 by a filter unit 30, it is furthermore possible to ensure a releasable hydraulic coupling of the respective water filter 36 to the water lines 34 of the associated water extraction unit 24.

The housing 46 of the water filter 36 has a cylindrical form or an at least substantially cylindrical form. The housing 46 may be designed as a plastics housing or as a metal housing. Accordingly, the housing 46 may for example be formed as a sheet-metal housing or as an aluminium housing.

It has furthermore proven to be advantageous if the first port 50 of the water filter 36 is arranged on a first end side 54 of the housing 46. The second port 52 of the water filter 36 may be arranged on a second end side 56 of the housing 46. The second end side 56 is preferably an end side averted from the first end side 54.

Preferably, the filter cartridge retainer of the filter unit 30 has counterpart ports corresponding to the two ports 50, 52, such that each of the counterpart ports is releasably coupled to one of the ports 50, 52 of the water filter 36 when the water filter 36 is plugged into the filter cartridge retainer. Here, it has proven to be particularly advantageous if the ports 50, 52 of the water filter 36 are formed as ports 50, 52 formed flat with the respective end sides 54, 56, as is the case for example in the case of the water filters 36 schematically illustrated in FIGS. 5 and 6.

The first filter material 38 is designed for filtering particles out of the water that flows through the first filter material 38. Preferably, the first filter material 38 is formed as activated carbon filter material. Particles not dissolved in the water can thus be filtered out. Furthermore, particles dissolved in the water can be filtered out by means of the activated carbon filter by absorption. To achieve a particularly simple separation between the first filter material 38 and the second filter material 40, it has proven to be advantageous if for example the first filter material 38 is of dimensionally stable and open-pore form.

In the case of the water filter 36 schematically illustrated in FIG. 4, the housing 46 is illustrated in semitransparent form, such that the first filter material 38 is schematically visible. This applies correspondingly to the second filter material 40. The two filter materials are separated from one another. In the embodiment of the water filter 36 illustrated by way of example in FIG. 4, the second filter material 40 is arranged downstream of the first filter material 38 in a flow direction (A) of the water. If water is now conducted into the interior space 48 of the housing 46 through the first port 50, the water firstly flows through the first filter material 38. Here, particles are removed from the throughflowing water. The water thereupon flows through the second filter material 40 in order to reduce the accumulations of hardness by the water. Finally, the water flows out through the second port 52. Said port 52 is coupled by means of a counterpart port, a water line, and possibly further water-conducting elements, to the at least one tapping point 32.

The second filter material 40 may have a catalyst material or be formed as a catalyst material, such that the hardness stabilization of the water flowing through the second filter material 40 is realized by means of catalysis. Alternatively and/or in addition, the second filter material 40 may be designed so as to combine calcium and/or carbonate ions from the water to form limescale crystals by means of catalyst technology. In this way, accumulations of hardness are reduced.

A further embodiment of the second filter material 40 is characterized in that the second filter material 40 has or is formed by cation exchanger resin material, wherein the cation exchanger resin material is designed for the softening of water. Accordingly, the cation exchanger resin material may be designed for exchanging calcium cations, which are dissolved in the water, for sodium cations of the cation exchange material. The water hardness is reduced in this way.

The second filter material 40 may likewise be of dimensionally stable and open-pore form. If both filter materials 38, 40 are of dimensionally stable and open-pore form, these may, as schematically illustrated in FIG. 4, be arranged in series in the flow direction (A). Provision may however also be made for the first filter material 38 and/or the second filter material 40 to each be of granule-like form. The first filter material 38 and the second filter material 40 may then be provided, mixed together, in the interior space 48 of the water filter 36, as schematically shown for example in the embodiment of FIG. 5. A distinct spatial separation between the first filter material 38 and the second filter material 40 is not provided here.

By contrast, if a separation is desired, then a screen-like partition 58 may be integrated into the housing 46. It has proven to be advantageous if the interior space 48 of the housing 46 is divided by the screen-like partition 58 into a first filter chamber 60 and a second filter chamber 62. It is then possible for the first filter material 38 to be arranged exclusively in the first filter chamber 60 and for the second filter material 40 to be arranged exclusively in the second filter chamber 62. By means of the screen-like partition 58, the first filter material 38 and/or the second filter material 40 may also be provided as granule-like filter material, without mixing occurring between the two filter materials 38, 40. This in turn ensures that the water is firstly filtered by the first filter material 38, and is freed from particles in the process, before said water flows to and through the second filter material 40, in order to realize a reduction of the water hardness.

In the case of the water filter 36 illustrated in FIG. 4, the water flows through the water filter 36 in the longitudinal axial direction L. It is however also possible for the water to flow through the water filter 36 in a radial direction R, as is the case for example in the water filter 36 from FIGS. 5 and 6.

Figure 5:
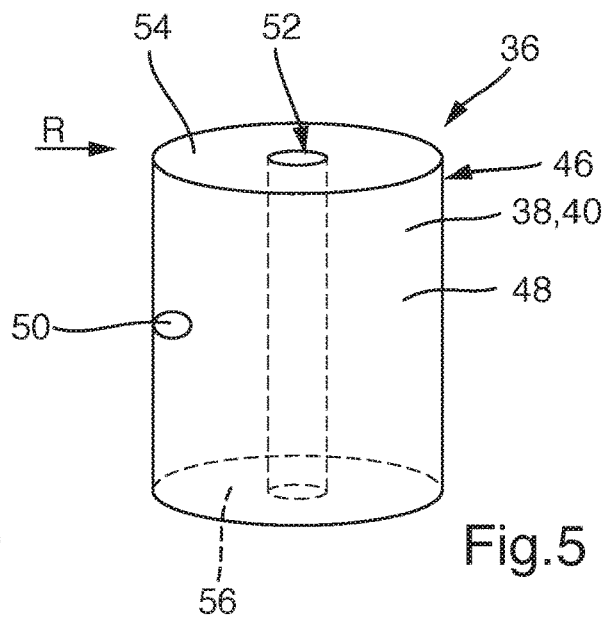
FIG. 5 shows a second exemplary embodiment of the water filter in a schematic perspective illustration.
Figure 6:
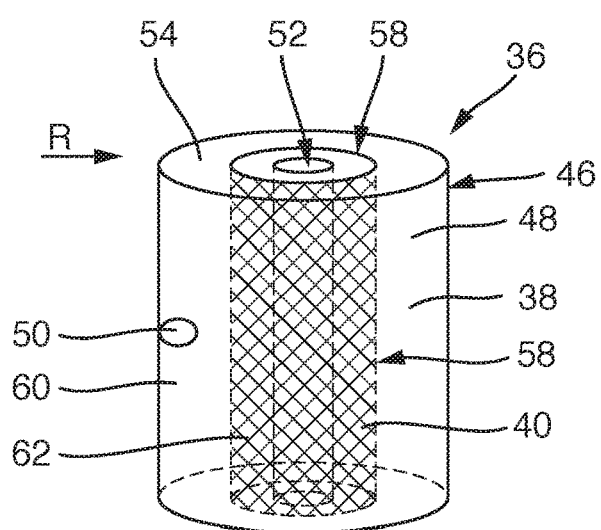
FIG. 6 shows a third exemplary embodiment of the water filter in a schematic perspective view.

In the case of the water filters 36 from FIGS. 5 and 6, provision is preferably made whereby the housing 46 of the water filter 36 has a hollow cylindrical form. The first port 50 may be arranged on an outer shell wall of the housing 46. The second port 52 may be formed on a shell-side inner wall or on one of the end surfaces of the hollow interior space. In the abovementioned second variant, provision is preferably made whereby the shell-side inner wall of the hollow cylindrical housing 46 is of water-permeable, in particular screen-like, form.

In the embodiment of the water filter 36 illustrated by way of example in FIG. 6, provision is furthermore made whereby a ring-shaped and screen-like partition is arranged as the partition 58 in the interior space 48 of the housing 46, such that the first filter chamber 60 is arranged radially to the outside of, and so as to be separated by means of the partition 58 from, the second filter chamber 62. Here, provision is likewise preferably made for the first filter material 38 to be arranged exclusively in the first filter chamber 60 and for the second filter material 40 to be arranged exclusively in the second filter chamber 62. The first port 50 arranged on the outer shell wall serves for allowing water to flow into the interior space 48 or into the first filter chamber 60, such that said water is freed from particles, or at least subjected to a reduction in particles, by means of the first filter material 38. Subsequently, the water flows through the ring-shaped, screen-like partition 58 in order to flow into the second filter chamber 62, in which the second filter material 40 is situated, such that softening of the water that flows through takes place here.

It is additionally pointed out that "having" does not rule out other elements, and "a" or "an" does not rule out a multiplicity. It is also pointed out that features that have been described with reference to one of the above exemplary embodiments may also be used in combination with other features of other exemplary embodiments described above. Reference designations in the claims are not to be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft, having:
an aircraft fuselage;
a cabin region formed in the aircraft fuselage;
an underfloor region formed in the aircraft fuselage and separated from the cabin region by a floor partition arranged in the aircraft fuselage; and
a fresh-water supply system,
wherein the fresh-water supply system has a fresh-water provision unit arranged in the underfloor region,
wherein the fresh-water supply system has multiple water extraction units each arranged in the cabin region,
wherein the fresh-water supply system has a water line network branched off from the fresh-water provision unit and extending to the water extraction units, such that water can flow from the fresh-water provision unit to each of the water extraction units,
wherein each water extraction unit has a shut-off valve, a filter unit and a tapping point, coupled in series by water lines, such that water can flow from the shut-off valve through the filter unit to the tapping point,
wherein each filter unit has an exchangeable water filter with a first filter material and with a second filter material,
wherein the first filter material is configured for filtering particles out of the water flowing through the water filter, and
wherein the second filter material is configured for softening the water flowing through the water filter.

2. The aircraft according to claim 1, wherein the first filter material is activated carbon filter material.

3. The aircraft according to claim 1, wherein the second filter material is formed as a catalyst material.

4. The aircraft according to claim 1, wherein the first filter material and/or the second filter material is of granulate-like form.

5. The aircraft according to claim 1, wherein the first filter material and/or the second filter material is of dimensionally stable and/or open-pore form.

6. The aircraft according to claim 1, wherein a part of the water line network arranged in the underfloor region has no filters for water filtering.

7. The aircraft according to claim 1, wherein the water filter of each filter unit is formed as an exchangeable water filter cartridge held releasably by a filter cartridge holder of the respective filter unit.

8. The aircraft according to claim 7, wherein each water filter cartridge is formed as a water filter cartridge configured to be plugged into and unplugged from the respective filter cartridge holder, and wherein each of the filter cartridge holders is configured for the plugging-in and unplugging of a water filter cartridge.

9. The aircraft according to claim 1, wherein the multiple water filters are of identical design.

10. The aircraft according to claim 1, wherein each water extraction unit is assigned to in each case one kitchen monument in the cabin region or in each case one toilet monument in the cabin region.

11. The aircraft according to claim 1, wherein each water filter comprises:
a housing;
an interior space formed by the housing;
a first port for the supply of water into the interior space; and
a second port for the discharge of water out of the interior space,
wherein the interior space is filled with the first and second filter material such that water can flow from the first port to the second port while being in direct contact with the filter materials.

12. The aircraft according to claim 11, wherein the interior space of the housing is divided by a screen-like partition into a first filter chamber and a second filter chamber, and
wherein the first filter material is arranged exclusively in the first filter chamber and the second filter material is arranged exclusively in the second filter chamber.

13. The aircraft according to claim 12, wherein the partition of each water filter is configured and/or arranged such that the second filter chamber is arranged downstream of the first filter chamber in a flow direction for water from the first port to the second port.

14. The aircraft according to claim 12, wherein the housing of each water filter has a cylindrical form, and
wherein the first port of the respective water filter is arranged on a first end side of the housing, the second port of the respective water filter is arranged on a second end side of the housing, and the partition of the respective water filter is arranged between the end sides of the housing such that the filter chambers of the respective water filter are arranged in series in a longitudinal axial direction of the housing so as to be separated by the partition.

15. The aircraft according to claim 12, wherein the housing of each water filter has a hollow cylindrical form, and the partition of the respective water filter is arranged as a ring-shaped partition in the interior space of the housing, such that the first filter chamber of the respective water filter is arranged radially to the outside of, and so as to be separated by the partition from, the second filter chamber of the respective water filter.

\* \* \* \* \*